May 16, 1967 M. A. DIKE 3,319,315

METHOD OF PREPARING MAGNETIC MEMORY DEVICE

Filed Nov. 21, 1962

INVENTOR.
MELVILLE A. DIKE
BY [signature]
ATTORNEY 3,319,315
Patented May 16, 1967

3,319,315

METHOD OF PREPARING MAGNETIC MEMORY DEVICE

Melville A. Dike, Los Altos, Calif., assignor to Tech-Met Corporation, Sunnyvale, Calif., a corporation of California Filed Nov. 21, 1962, Ser. No. 239,173
7 Claims. (Cl. 29—155.5)

This invention relates to a method of preparing magnetic memory devices, and particularly to the formation of an ultra smooth magnetic record surface for memory discs, drum, cylinders and the like and to devices so formed.

Magnetic memory devices such as disc and cylinders are generally formed upon an aluminum substrate having a surface machined to a high degree of accuracy to be perpendicularly planar with the axis of rotation of the disc or to be concentric with the axis of rotation of the drum. These surfaces are highly polished for a high degree of smoothness and are thereafter coated with a magnetic recording media usually containing a ferromagnetic oxide dispersed in an organic medium which forms the magnetic record surface.

Magnetic memory discs, drums, cylinders and the like, being rigid, have certain properties that are different from magnetic recording tape and film, which are relatively soft and flexible. The recording and play-back heads are usually not in absolute contact with the record surface of the disc or the like for the unyielding nature of the substrate would cause excessive wear and damage the coating and heads. However, it is desirable to have these heads as close as possible to the record surface of the memory device in order to impress and receive high density useful and reproducible signals.

Unless the record surface of the disc is absolutely smooth and perpendicular to its axis of rotation, or the record surface of the drum is absolutely smooth and concentric with its axis of rotation, the spacing between the heads and the record surface varies as the memory device rotates thereby producing air gap variations. Such air gap variations show up as noise, loss of output signal and drop-outs, reduces the information storage density and must be eliminated if extremely high accuracy is desired or required.

All presently used conventional magnetic memory devices utilizing a substantially rigid substrate have been found wanting with regard to record surface smoothness and trueness about its axis of rotation (or translation). As a consequence of the lack of truly smooth magnetic record surfaces in application requiring extremely high accuracy, a plurality of magnetic recorders are presently utilized in parallel so that, at least statistically, there is no loss of information due to drop-outs or other imperfections of the device. In the latest orbital flight of astronaut Walter Schirra, to the best of my knowledge, the telemetering data were received by three magnetic recorders operating in parallel.

Heretofore, attempts to improve the smoothness and trueness of the record surface have centered on either improving the smoothness and trueness of the surface of the rigid substrate upon which the magnetic coating is applied or on making the magnetic coating sufficiently hard to be machinable or both. The latter approach involves machining a magnetic coating, usually of uniform thickness to start with, and results in a magnetic layer which, after machining, suffers from non-uniform thickness causing variation in the impressed and reproduced signal level even though the air gap variations might have been minimized.

Attempts to smooth and true the substrate surface likewise have not been entirely successful, particularly in case of metallic substrate such as aluminum or magnesium. When the surface of such metallic substrate is lapped to get a very smooth surface finish, the surface actually gets dull gray, dark and rough. Prior to applying the magnetic material coating, the surface requires cleaning and must be etched in a highly alkaline solution to dissolve the oxide. Since aluminum is non-homogenous, the etching rate is non-uniform, producing a non-uniform and rough surface. Thereafter, application of the magnetic coating upon the rough surface by electro-chemical deposition or by chemical reduction of nickel cobalt alloys or the like produces a rough record surface which is not even of uniform thickness.

Only one attempt known has met with some success and that is to plate a copper layer over the metallic substrate after zincate treatment of the same. Thereafter the copper surface can be lapped to be fairly smooth and cleaned in a weak acid dip to remove the copper oxide. The lap marks, however, are never entirely eliminated and the porosity of the substrate is always visible. A magnetic media plated on the lapped and cleaned copper surface results in a fairly smooth record surface but even such record devices have been found wanting in output frequency response, reliability and freedom from drop-outs, primarily because the lap marks and porosity of the copper layer and the surface defects of the deposited magnetic surface are also present in the record surface.

It is therefore an object of this invention to provide a magnetic memory device of the disc, drum, cylinder type or the like having an ultra smooth and uniform record surface which is true with respect to the axis of rotation or plane of translation of the memory device relative to the magnetic head or sensor.

It is also an object of this invention to form an ultra smooth magnetic record surface upon a substantially rigid substrate.

It is a further object of this invention to provide a magnetic memory device which has an increased frequency response, greater reliability and lower drop-out rate than has been possible heretofore.

It is still another object of this invention to provide a magnetic memory device which includes a lubricated, hard record surface to increase its useful like and decrease wear on the magnetic head.

It is still a further object of this invention to provide a more reliable, longer wearing and more economical magnetic memory device which has vastly superior performance characteristics in comparison with presently known magnetic discs, drums, cylinders and the like.

Briefly, in accordance with one embodiment of the present invention of preparing a magnetic memory disc, an optically flat glass disc master is finished on one surface to a smoothness similar to that of a finely ground flat lens. This working surface is then coated with a thin layer of silver to sensitize the same for electro-deposition of the magnetic media. The glass master with its sensitizing silver layer working surface is then exposed to a plating bath and plated with a proper thickness of magnetic material.

The magnetically coated master is then transferred into a copper plating tank where the magnetic surface is backed with a heavy layer of copper to make a durable and rigid disc. Thereafter the copper layer is machined to be true with the working surface and smooth. Thereafter the copper layer, together with the magnetic coating and the silver coating, is separated from the working surface of the glass master and the machined copper layer surface is bonded to a plastic or metallic substrate. The silver layer surface structure so constructed forms the record surface and has the smoothness and trueness of the glass master surface.

Other objects and a better understanding of the invention may be had by reference to the following description, taken in conjunction with the accompanying drawings, in which:

FIGS. 2A to 6A are views helpful in explaining the formation of the surfaces of the memory disc of FIG. 1 in accordance with this invention and show the various progressive steps taken. FIGS. 2B to 6B are enlarged cross sectional views of encircled portions of FIGS. 2A to 6A showing the detail of the surface layer formations;

Figures 7A, 7B:
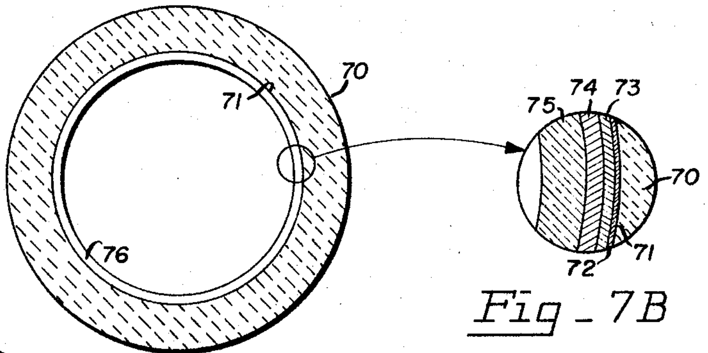
Figures 8A, 8B:
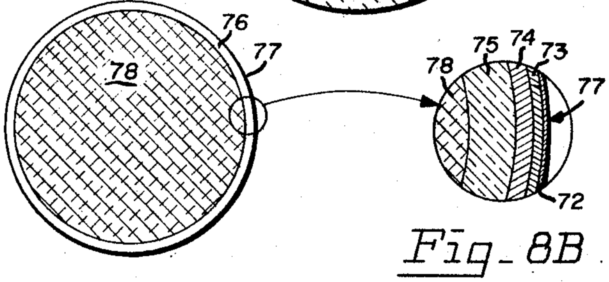

FIG. 7A shows the formation of a memory drum or cylinder surface in accordance with this invention. FIG. 7B is an enlarged cross sectional view of the encircled portion showing the arrangement of the various layers formed in FIG. 7A; and FIG. 8A is a memory drum or cylinder constructed from the surface shown in FIG. 7. FIG. 8B is an enlarged cross sectional view of the encircled portion of FIG. 8A showing the several layers.

Figures 1A, 1B:
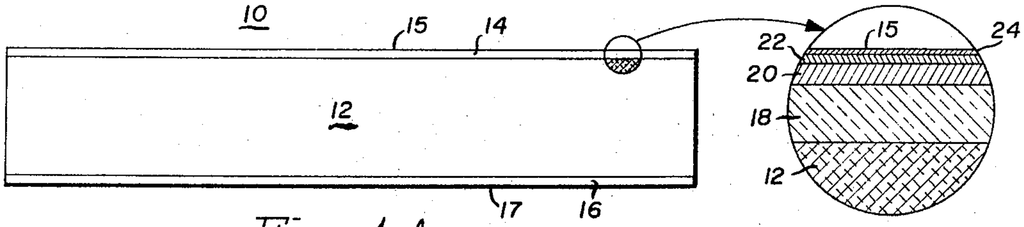
FIG. 1A is a double-surfaced magnetic memory disc constructed in accordance with this invention and FIG. 1B is an enlarged cross sectional view of the encircled portion of FIG. 1A showing the arrangement of the various layers on the disc surface.

Referring now to the drawings, and more particularly to FIG. 1A thereof, there is shown a double-surfaced magnetic memory disc 10 constructed in accordance with this invention. Memory disc 10 comprises a disc-shaped substrate 12 having cemented to its upper surface a surface structure 14 and to its lower surface a surface structure 16. Disc-shaped substrate 12 may comprise any substantially rigid non-magnetic solid material, and preferably one which is light in weight. For example, such materials as aluminum, magnesium or plastics are admirably suitable for forming the substrate for magnetic memory discs.

Surface structures 14 and 16 are usually of identical construction so that the description of one will be equally applicable to the other. Generally speaking, surface structures 14 and 16 comprise a plurality of layers of different materials progressively built on one another utilizing the method to be fully described hereinafter. Preliminarily, each surface structure includes a copper layer 18 which serves as backing, a layer of magnetic material 20 which serves as the magnetic memory, a layer of rhodium 22 for protecting magnetic material layer 20 from wear, and finally a silver layer 24 whose most important function in the construction of surface structure 14 will presently be explained. The exposed outer surfaces 15 and 17 of surface structures 14 and 16 respectively form the record surfaces.

As will become more clear hereinafter, rhodium layer 22 may be dispensed with entirely so that silver layer 24 is immediately adjacent to magnetic material layer 20. Likewise, in certain applications of the surface structure, silver layer 14 may be removed so that surface structure 14 comprises only copper layer 18 as backing for magnetic material layer 20 and the exposed surface of layer 20 forms the record surface.

Surface structures 14 and 16 are constructed separately from substrate 12 and are affixed thereto by cementing copper layer 18 securely to the substrate surface. The construction of surface structure 14 will now be explained in connection with FIGS. 2 to 6.

The first step in the process of forming surface structure 14 in accordance with this invention is to select a glass master having a working surface which is the exact negative of the desired record surface. In case of a magnetic memory disc, the glass master working surface would be an optically flat surface and in case of a magnetic memory drum or cylinder, the glass master working surface would take the form of the inner surface of a cylindrical sleeve constructed to be perfectly round and concentric with a center line. In each case the glass master working surface is ground to have the finish of a finely finished lens.

Figures 2A, 2B, 3A, 3B, 4A, 4B, 5A, 5B, 6A, 6B:
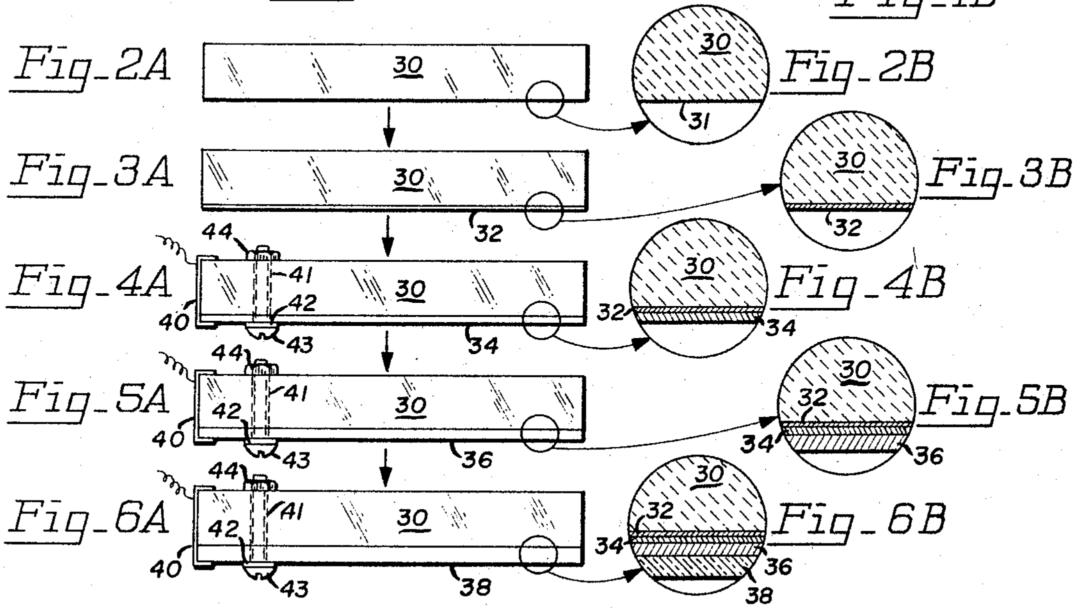

In summary therefore, the glass master working surface is optically as perfect as possible and finely ground for ultra smoothness and is formed to be the exact negative of the desired record surface. FIGS. 2A and 2B show a glass master 30 having an optically flat and finely ground working surface 31 useful for the construction of surface structure 14 for a disc.

The next step in the process of forming surface structure 14 is to carefully clean working surface 31 preliminarily to silver plating. Working surface 31 may be cleaned in a very hot alkali cleaning bath such as a hot soap cleaner, is then carefully rinsed and dried, and thereafter rubbed with some precipitated chalk to remove any possible organic matter clinging to surface 31. Thereafter working surface 31 is again rinsed with distilled water and exposed to concentrated nitric acid to further remove organic contamination. The nitric acid is then carefully washed off with distilled water to assure absolute cleanliness and is now ready for the next step.

The next step in this process is the application of a thin layer of silver 32 to cleaned working surface 31. To this end a ½% solution of a stannous chloride is applied to cleaned working surface 31 to sensitize the same by precipitating thereon some tin ions preparatory to the subsequent chemical reduction of silver. Thereafter working surface 31 is very carefully and thoroughly rinsed to remove the chloride solution and submerged in a solution of ammonical silver to which is added a reducing solution of dextrose and formaldehyde, a standard mirror preparation solution.

In this manner, a thin layer of pure silver is reduced upon sensitized working surface 31 by chemical reduction which provides working surface 31 with an electrically conductive silver layer 32. It has been found that a silver layer thickness somewhere between 40 and 120 millimicrons is eminently suitable for providing a good conductive layer for electro-deposition of the next layer of surface structure 14.

The next step in the process, after carefully washing conductive silver layer 32, is to apply electrical contacts to silver layer 32, either by attaching a metallic ring 40 around the outer edge of master 30 or by providing a small hole 41 extending through the body of glass master 30 so that a washer 42 can be secured against conductive silver layer 32 by engagement with a screw 43 clamped tightly with a nut 44. Working surface 31 is now ready for electroplating.

In certain cases, a very hard and wear-resistant record surface may be found desirable which may be provided by a rhodium layer immediately adjacent magnetic memory material layer 20. In this case, the next step in the process is to immerse silver plated glass master 30 into a rhodium plating solution for conventional rhodium plating. It has been found that a rhodium layer thickness of from 100 to 500 millimicrons provides a hard and wear-resistant surface which does not interfere with the recording and reproducing process. FIG. 4 shows working surface 31 of glass master 30 being coated with a conductive silver layer 32 and a wear-resistant rhodium layer 34.

The next step in the process is the formation of the magnetic material layer 36 either upon silver layer 32 or upon rhodium layer 34 as the case may be. To this end, glass master 30 is placed into a conventional electrochemical nickel cobalt or alloy tank in which a magnetic layer is electroplated thereon. The thickness of magnetic layer 36 is selected in accordance with the frequency of the electrical signals to be recorded and may vary anywhere between 125 millimicrons and several thousand microns.

The next step in the process, after careful cleaning, is to plate a metallic non-magnetic backing layer 38 such as copper or the like upon magnetic material layer 36. This may be accomplished by placing magnetic material layer 36 into an acid copper solution which deposits copper in a conventional manner. Backing layer 38 is selected to be of sufficient thickness to form a good strong and rigid backing for the magnetic layer 36 when the same is separated from glass master 30. It has been found that a copper layer thickness of approximately 40 to 80 mils is quite suitable for this purpose and is obtainable in about 6 to 8 hours plating time.

The next step in the process is the preparation of the exposed surface of copper layer 38 for cementing upon a substrate surface. Since plating to a thickness of about 60 mils leaves the same rough and uneven, glass master 30 is clamped to a suitable vacuum chuck of a lathe and the exposed surface of copper layer 38 is carefully machined until substantially parallel to working surface 31 and relatively smooth and even. In this manner a substantially smooth and planar backing surface is provided which is eminently suitable for being cemented or otherwise affixed to a substrate.

After constructing surface structure 14 by building the same layer by layer on working surface 31 of glass master 30, the next step is to separate one from the other. This is best accomplished by alternately heating and cooling glass master 30 to spoil or break the bond between silver layer 32 and working surface 31. It has been found that recycling glass master 30 a number of times between temperatures of 32° F. and 160° F. readily spoils the bond because of the different temperature coefficients of glass and the composite structure of electroplated layers.

After the bond between the silver layer 32 and working surface 31 is broken, surface structure 14 is lifted off glass master 30 for attachment to a convenient substrate to which it may be cemented by conventional techniques. Silver layer 32, now separated from working surface 31, is of the exact replica thereof and of the same degree of smoothness so that surface structure 14 has an absolutely planar and ultra smooth record surface.

In many applications, silver layer 32 may be left upon magnetic layer 36 since it provides a lubricated surface for contact with a magnetic head. The silver layer also provides a certain degree of protection to magnetic layer 36. As has already been mentioned, silver layer 32 may be removed if so desired by the application of a chromic acid solution containing 32 oz./gal. of chromic acid.

In case surface structure 14 is constructed with a rhodium layer between magnetic layer 36 and silver layer 32, the latter may either be etched off or left on. Because of the extreme thinness of layer 34, the same will have a negligible effect on the magnetic properties of magnetic layer 36. If silver layer 32 is left on rhodium layer 34 the same will wear off in use and expose the very hard and wear-resistant rhodium layer 34 which protects magnetic layer 36.

Since the exposed surface of copper layer 38 is machined smooth prior to separation of surface structure 14 from glass master 30, cementing the same to a plastic, magnesium or aluminum substrate surface will present no difficulties. Any small surface irregularities left by machining the bonding surface of copper layer 38 or upon the bonding surface of a substrate will have no effect on the smooth record surface since copper layer 38 is sufficiently thick and rigid to prevent any irregularities from being transmitted therethrough in the bonding process.

The hereinabove described method of preparing planar surface structures such as 14 for cementing to the planar surface of a disc-shaped substrate may also be utilized in connection with the preparation of cylindrical surface structures for affixing to the cylindrical surface of a drum-shaped substrate.

More particularly, as best shown in FIG. 7, a glass master 70 having the form of a cylindrical sleeve is utilized. The inner peripheral surface of glass master 70, which forms the working surface 71, is prepared with very great care to be perfectly cylindrical and ultra smooth such as can be realized by the employment of glass grinding techniques. Even though the cost of preparing a suitable glass master 70 may be initially quite high, it must be realized that glass master 70 is reusable innumerable times so that its initial cost, when distributed over thousands of surface structures produced with its aid, becomes rather insignificant.

Working surface 71 is prepared with the same care and in the same manner explained in connection with working surface 31 of planar glass master 30 in that it is carefully cleaned and chemically coated with a thin silver layer 72 to provide a conductive surface. Thereafter silver layer is electroplated with rhodium layer 73 which in turn is electroplated with a magnetic material layer 74 which in turn is electroplated with a heavy copper layer 73 which serves as a backing for the several layers. The resulting plurality of layers, which include silver layer 72, rhodium layer 73, magnetic material layer 74 and copper backing layer 75 form a cylindrical surface structure 76 built upon gass master working surface 71. The method of plating each layer may be the same explained in connection with the preparation of surface structure 14.

Before breaking the bond between working surfaces 71 and silver layer 72 to separate surface structure 76 from glass master 70, the same is inserted into the chuck on a lathe so that the exposed inner surface of copper layer 75 may be machined to be smooth, cylindrical, and concentric with working surface 71. Thereafter surface structure 76 is separated from glass master 70 by heating glass master 70 and at the same time cooling surface structure 71 by exposing the machined copper surface to Dry Ice and alcohol. In this manner glass master 70 is expanded and surface structure 76 is contracted which easily breaks the bond thereby exposing a cylindrical surface structure of a magnetic material coated with silver which is true cylindrical and ultra smooth and forms a record surface 77. Thereafter surface structure 76 may be filled with an epoxy resin for greater rigidity or may be shrunk upon aluminum or magnesium drum 78, FIG. 8, in a manner well known to those skilled in the art.

The method hereinabove described for constructing ultra smooth planar and cylindrical record surfaces of surface structures having a copper-backed magnetic material, can also be employed in connection with the construction of other shapes of surface structures suitable for mounting upon spheres, stepped cylinders, cones and the like. In each instance the first step is to provide a glass master having a working surface which is the exact negative of the desired record surface. Thereafter, the working surface is used as a base for the construction of a surface structure as described hereinabove.

The methods described hereinabove for constructing the various surface layers are representative only, and other well-known layer formation techniques may be substituted therefor. For example, constructing the magnetic material layer may be accomplished not only by the electroplating method described in here but may likewise be accomplished by vacuum sputtering, evaporation, chemical plating, or any other process which produces a continuous layer of permanently magnetizable film magnetic material such as cobalt nickel or other alloys. This is likewise true of the other materials deposited.

In certain embodiments of practicing this invention the glass master working surface may be sensitized (made conductive) by chemically depositing another metallic layer thereon such as for example gold. However, it has been found that best results are obtainable with a chemically reduced silver layer because of the ease of breaking the bond between it and the resulting surface structure. Since one of the primary purposes of this invention is to provide an ultra smooth outer surface it becomes very imporant that the spoilage of the bond between the surface structure and the working surface does in no way detract from the resulting smoothness.

What is claimed is:

1. A method of making a surface structure having an ultra-smooth surface for cementing to a substrate to form a magnetic memory device which comprises the steps of:

chemically depositing a layer of silver upon an optically smooth working surface of a glass master, precision ground to be the exact negative of the record surface of the magnetic memory device;

depositing a magnetic coating on said silver layer;

depositing a metallic non-magnetic coating upon said magnetic coating; and breaking the bond between said silver layer and said working surface to remove the surface structure from said glass master for affixing to said substrate.

2. A method of making a magnetic memory device having an ultra-smooth record surface, which comprises the steps of:

chemically depositing a metallic non-magnetic coating upon an optically smooth working surface of a glass master, precision ground to be the exact negative of the recording surface of the magnetic recording device;

depositing a magnetic coating on said metallic non-magnetic coating;

electroplating said magnetic coating to form a further metallic non-magnetic layer thereon having a thickness very much greater than said metallic non-magnetic coating first deposited;

breaking the bond between said metallic non-magnetic coating and said working surface and removing the deposited structure from said working surface; and bonding the surface of said further metallic non-magnetic layer to the surface of a substrate.

3. A method of making a surface structure having an ultra-smooth surface for cementing to a substrate to form a magnetic memory device which comprises the steps of:

chemically depositing a layer of silver upon an optically smooth working surface of a glass master, precision ground to be the exact negative of the record surface of the magnetic memory device, to provide a conductive working surface;

depositing a magnetic coating on said silver layer;

depositing a metallic non-magnetic coating upon said magnetic coating;

machining the exposed surface of said metallic non-magnetic coating to make the same smooth and substantially parallel to said working surface; and breaking the bond between said silver layer and said working surface to remove the surface structure from said glass master.

4. A method of making a magnetic memory device having an ultra-smooth record surface, which comprises the steps of;

chemically depositing a layer of silver upon an optically smooth working surface of a glass master, precision ground to be the exact negative of the record surface of the magnetic memory device, to provide a conductive working surface;

applying an electrode to said conductive surface;

depositing a magnetic coating on said silver layer;

electro-plating said magnetic coating to form a metallic non-magnetic coating thereon;

machining the exposed surface of said metallic non-magnetic coating to make the same smooth and substantially parallel to said working surface;

breaking the bond between said silver layer and said working surface and removing the plated structure from said working surface; and bonding the machined surface of said metallic non-magnetic coating to the surface of a substrate.

5. A method of making a magnetic memory device having an ultra-smooth record surface, which comprises the steps of:

chemically depositing a layer of silver of 40 to 120 millimicrons thickness upon an optically smooth working surface of a glass master, precision ground to be the exact negative of the record surface of the magnetic memory device, to provide a conductive working surface;

depositing a magnetic coating on said silver layer;

electroplating said magnetic coating to form a metallic non-magnetic coating hereon of 2 to 80 mils thickness for rigid backing;

machining the exposed surface of said metallic non-magnetic coating to make the same smooth and substantially parallel to said working surface;

breaking the bond between said silver layer and said working surface by alternately heating and cooling said glass master and removing the surface structure therefrom; and cementing the machined surface of said surface structure to a substrate.

6. A method of making a magnetic memory device having an ultra-smooth record surface, which comprises the steps of:

chemicaly depositing a layer of silver of 40 to 120 millimicrons thickness upon an optically smooth working surface of a glass master, precision ground to be the exact negative of the record surface of the magnetic memory device, to make said working surface conductive;

applying an electrode to said conductive working surface;

electroplating said conductive surface to form a rhodium coating thereon of 100 to 500 microns thickness;

electroplating said rhodium coating to form a magnetic coating thereon;

electroplating said magnetic coating to form a metallic non-magnetic coating thereon of 2 to 80 mils thickness for rigid backing;

machining the exposed surface of said metallic non-magnetic coating to make the same smooth and substantially parallel to said working surface;

breaking the bond between said silver layer and said working surface by alternate heating and cooling to remove the plated structure from said glass master; and cementing said machined surface to a suitable substrate.

7. A method of making a magnetic memory device having an ultra-smooth record surface, which comprises the steps of:

preparing a glass master to have an ultra-smooth working surface which is the exact negative of the record surface;

chemically depositing a layer of silver of 40 to 120 millimicrons thickness upon said working surface to provide a conductive working surface;

applying an electrode to said conductive working surface;

electroplating said conductive surface to form a coating selected from rhodium and chromium thereon of 100 to 500 microns thickness;

electroplating said rhodium coating to form a magnetic coating thereon;

electroplating said magnetic coating to form a metallic non-magnetic coating thereon of 2 to 80 mils thickness for rigid backing;

machining the exposed surface of said metallic non-magnetic coating to make the same smooth and substantially parallel to said working surface;

breaking the bond between said silver layer and said working surface and removing the plated structure from said glass master;

cementing the machined surface of said metallic non-magnetic coating to the surface of a substrate; and removing the silver layer to expose the magnetic coating.

References Cited by the Examiner

UNITED STATES PATENTS

| | | | |
|---|---|---|---|
| 2,597,296 | 5/1952 | Cook | 204—12 X |
| 2,945,217 | 7/1960 | Fisher et al. | 340—174 |
| 3,042,997 | 7/1962 | Anderson et al. | 29—155.5 |
| 3,077,586 | 2/1963 | Ford | 340—174 |
| 3,086,280 | 4/1963 | Gibbs et al. | 29—155.5 |
| 3,197,749 | 7/1965 | Clinehens | 340—174 |
| 3,213,431 | 10/1965 | Kolk | 340—174 |

JOHN F. CAMPBELL, *Primary Examiner.*

C. I. SHERMAN, R. F. DROPKIN, *Assistant Examiners.*